US011163999B2

(12) United States Patent
Arshad et al.

(10) Patent No.: US 11,163,999 B2
(45) Date of Patent: Nov. 2, 2021

(54) AUGMENTED REALITY-BASED CAPTURE, PROCESSING AND TRANSFER OF OCCUPATIONAL KNOWLEDGE

(71) Applicant: PTC Inc., Boston, MA (US)

(72) Inventors: Umar Arshad, Cambridge, MA (US); Varun Ramesh Mani, Cambridge, MA (US); Sara Remsen, Somerville, MA (US)

( * ) Notice: Subject to any disclaimer, the term of this patent is extended or adjusted under 35 U.S.C. 154(b) by 34 days.

(21) Appl. No.: 16/417,982

(22) Filed: May 21, 2019

(65) Prior Publication Data

US 2019/0354761 A1 Nov. 21, 2019

Related U.S. Application Data

(60) Provisional application No. 62/674,029, filed on May 21, 2018.

(51) Int. Cl.
*G06Q 10/06* (2012.01)
*G10L 15/08* (2006.01)
(Continued)

(52) U.S. Cl.
CPC ............ *G06K 9/00671* (2013.01); *G06T 7/20* (2013.01); *G06T 7/70* (2017.01); *G09B 19/003* (2013.01);
(Continued)

(58) Field of Classification Search
None
See application file for complete search history.

(56) References Cited

U.S. PATENT DOCUMENTS 8,836,222 B1 * 9/2014 Patrick ................. H05B 47/105
315/154
10,735,691 B2 * 8/2020 Schmirler .............. H04N 7/181
(Continued)

OTHER PUBLICATIONS

Petersen, Nils, and Didier Stricker. "Learning task structure from video examples for workflow tracking and authoring." 2012 IEEE International Symposium on Mixed and Augmented Reality (ISMAR). IEEE, 2012.*
(Continued)

*Primary Examiner* — Zhengxi Liu
(74) *Attorney, Agent, or Firm* — Patent GC LLC; Alexander Franco (57) ABSTRACT

An augmented reality, mixed reality or virtual reality device is used to create occupational knowledge documentation, such as instruction and/or repair documentation for industrial equipment or processes. The device can be configured to capture time-synchronized data during a session in which an expert person, wearing or holding the device, performs a task to be documented. The data can include, for example, video data captured by a camera, audio data captured by a microphone within audio proximity of the camera, motion data captured by an inertial measurement unit physically fixed relative to the camera, and spatial data relating to locations of at least one of the plurality of objects within the field of view of the camera, wherein the spatial data is generated by one or more spatial sensors. The captured data can be automatically processed and used to render instruction on an augmented reality, mixed reality or virtual reality device.

17 Claims, 6 Drawing Sheets

(51) Int. Cl.
*G06T 7/70* (2017.01)
*G06K 9/00* (2006.01)
*G06T 7/20* (2017.01)
*G10L 15/22* (2006.01)
*G09B 19/00* (2006.01)

(52) U.S. Cl.
CPC .............. *G10L 15/08* (2013.01); *G10L 15/22* (2013.01); *G06T 2207/10016* (2013.01); *G06T 2207/30244* (2013.01); *G10L 2015/088* (2013.01)

(56) References Cited

U.S. PATENT DOCUMENTS

| | | | | |
|---|---|---|---|---|
| 10,747,300 | B2* | 8/2020 | Guven | G06K 9/00214 |
| 2015/0146007 | A1* | 5/2015 | Dusik | G06K 9/6202 |
| | | | | 348/161 |
| 2017/0364843 | A1* | 12/2017 | Haligowski | G06Q 10/0633 |
| 2017/0371163 | A1* | 12/2017 | Ries | G02B 27/0172 |
| 2018/0004481 | A1* | 1/2018 | Fallon | G06F 3/167 |
| 2018/0253900 | A1* | 9/2018 | Finding | G02B 27/017 |
| 2018/0276895 | A1* | 9/2018 | Hodge | G06T 11/00 |
| 2019/0114482 | A1* | 4/2019 | Li | G06Q 10/06 |
| 2019/0266804 | A1* | 8/2019 | Kohlhoff | G06T 13/20 |
| 2019/0369722 | A1* | 12/2019 | Lehtiniemi | G06F 3/011 |
| 2019/0370544 | A1* | 12/2019 | Wright, Jr. | G06F 3/011 |
| 2020/0117268 | A1* | 4/2020 | Kritzler | G06T 19/006 |

OTHER PUBLICATIONS

Petersen, Nils, Alain Pagani, and Didier Stricker. "Real-time modeling and tracking manual workflows from first-person vision." 2013 IEEE International symposium on mixed and augmented reality (ISMAR). IEEE, 2013.*
Petersen, et al., "AR Handbook 2013—YouTube Video Synopsis", www.youtube.com/watch?v=vtUdafED4rw, Jun. 6, 2013, 6 pages.
Petersen, et al., "IOXP Website page printout—Company", www.ioxp.de/en/company/, May 21, 2019, 3 pages.
Petersen, et al., "IOXP Website page printout—Documentation", www.ioxp.de/en/solutions/documentation/, May 21, 2019, 4 pages.
Petersen, et al., "Learning task structure from video examples . . . (Abstract)", 2012 IEEE International Symposium on Mixed and Augmented Reality (ISMAR), May 11, 2012, 2 pages.
Petersen, et al., "Real-time modeling and tracking manual workflows . . . (Abstract)", 2013 IEEE International Symposium on Mixed and Augmented Reality (ISMAR), Jan. 10, 2013, 2 pages.

* cited by examiner

AUGMENTED REALITY-BASED CAPTURE, PROCESSING AND TRANSFER OF OCCUPATIONAL KNOWLEDGE

RELATED APPLICATIONS

The subject matter of this application is related to U.S. Provisional Application No. 62/674,029, filed on 2018 May 21, which is hereby incorporated by reference in its entirety.

BACKGROUND OF THE INVENTION

The present disclosure relates to occupational knowledge capture and transfer, and particularly as this field relates to frontline workers—people who work primarily away from a desk and whose jobs include manual tasks that require their hands and limbs. Frontline workers can include, for example, individuals who work in laboratories, hospitals, manufacturing facilities, factories, oil and gas fields, agriculture, food preparation, hazardous materials, construction, and utilities/maintenance jobs, among others. Frontline workers rely heavily on standardized processes that have been traditionally memorialized as written documentation in the form of, e.g., best practices, standard operating procedures (SOPS), and/or work instructions. Written documentation has traditionally taken the form of text documents with step-by-step instructions on how to perform a particular procedure. Such documentation is extremely important for frontline businesses because it is generally used to facilitate training, to ensure safety, to ensure compliance with applicable laws and regulations, and to ensure quality of work product.

Although written documentation can be critically important to frontline workers, it has several flaws. First, it is currently very expensive to create. For example, in order to document best practices for a frontline job, most businesses have to rely upon knowledge and input from their most experienced frontline workers. To get this knowledge, a business will typically have to temporarily remove frontline workers from their tasks so that the workers can draft or help draft the documentation. This can result in extended periods of costly downtime for the business's most valuable employees. Creating documentation may require hiring expensive outside consultants, such as technical writers or process engineers.

Second, it can be time consuming to create documentation. One or more frontline experts may need to collaborate with one or more outside consultants to help draft the documentation. This process can take weeks, months, or even years depending on the processes to be documented. This delay can be extremely problematic because by the time the documentation is complete, it may already out of date as the underlying process may have changed during the ensuing period of time.

Third, because the documentation is often created in conference rooms or offices far away from where the actual work is done, it is often missing critical details regarding the procedures it is meant to cover. For example, frontline experts may not remember important steps in a process that may seem trivial or even unimportant to them due to their own familiarity with the process, and thus those critical steps may end up being excluded from the documentation. When such information is left out, it is often lost forever, requiring the business to pay for someone else to recreate that information from scratch. The cost of such omissions can be astronomical over time.

What is needed is a new way to quickly, efficiently, and comprehensively document and capture how frontline experts perform procedures or processes where they work and while they work, without requiring them to leave their jobs for extended periods of time.

SUMMARY OF THE INVENTION

An augmented reality, mixed reality or virtual reality device, such as an augmented reality application enabled mobile phone, or a mixed or virtual reality headset, can be used to efficiently create occupational knowledge documentation, such as instruction and/or repair documentation for industrial equipment or processes. The device can be configured to capture time-synchronized data during a session in which an expert person, wearing or holding the device, performs a task to be documented. The data can include, for example, video data captured by a camera, audio data captured by a microphone within audio proximity of the camera, motion data captured by an inertial measurement unit physically fixed relative to the camera, and spatial data relating to locations of at least one of the plurality of objects within the field of view of the camera, wherein the spatial data is generated by one or more spatial sensors. The captured data can be automatically processed and used to render instruction on an augmented reality, mixed reality or virtual reality device.

A server can include one or more processors and a memory, wherein the memory stores computer code that, when executed by the one or more processors, operates a knowledge processing engine. The knowledge processing engine can be configured to: receive environmental data generated by an AR device, the environmental data including video data, audio data, and spatial data; receive event data generated by the AR device; receive user-generated capture data created by the AR device; process the received environmental data, event data, and user-generated capture data to generate procedural workflow data, the procedural workflow data including step data for at least one step in a procedural workflow; and convert the procedural workflow data into at least one of a plurality of knowledge transfer formats.

In one embodiment, the environmental data relates to a procedural workflow capture session initiated by a user of the AR device. In one embodiment, the spatial data is generated using at least one depth sensor of the AR device. In one embodiment, the spatial data includes a location of at least one person within a physical environment. In one embodiment, the spatial data includes a location of at least one device within a physical environment. In one embodiment, the spatial data includes a location of at least one person's hands within a physical environment. In one embodiment, the spatial data includes a specification of a location of an item of interest within a physical environment over a period of time. In one embodiment, the event data includes timestamp data related to at least one user command generated during a procedural capture session. In one embodiment, the user-generated capture data is associated with a procedural capture session initiated by a user of the AR device. In one embodiment, the user-generated capture data is related to at least one user command generated during a procedural capture session. In one embodiment, the user-generated capture data includes at least one of photo data, video data, and spatial data.

An AR device can include one or more processors and a memory storing computer instructions, wherein the computer instructions, when executed by the one or more processors, cause the processors to operate a knowledge capture application. The knowledge processing application can be configured to: generate environmental data from a plurality of sensors on the AR device, the sensor data including video data, audio data, and spatial data, generate event data, the event data including at least one of user-generated event data, device-generated event data, or externally-generated event data, generate user-generated capture data from the AR device, the user-generated event data including at least one of picture snapshots, spatial snapshots, video clips, audio clips, or spatial clips, and transmit environmental data, event data, and user-generated capture data to a knowledge capture database.

A method can be performed by a computer system having at least one processor and a memory. The method can include: receiving time-synchronized session data including video data captured by a camera, audio data captured by a microphone within audio proximity of the camera, and motion data captured by an inertial measurement unit physically fixed relative to the camera, wherein the time-synchronized session data relate to a session during which a user physically performs a procedure having a plurality of steps, and wherein the audio data include spoken words of the user; processing the audio data to identify relative times during the session at which one or more of the plurality of steps commences; processing a set of data including the video data and the motion data to, for each of one or more objects within a field of view of the camera: identify the object, track the object over time, using the motion data, to determine a time-based series of locations of the object within the field of view of and relative to the camera, and augment the video data by overlaying added visual content over video frames containing the object, such that the added visual content tracks motion of the object within the video frames over time; and store, in association with one another: the video data, the audio data, the identified relative times, and the augmentations to the video data.

In one embodiment, the method can further include, substantially contemporaneously with capturing of the video data by the camera, for each of the one or more objects, displaying the added visual content as a virtual image in spatial relation to and tracking with the object in the user's visual field of view. In one embodiment, the virtual image can be projected into the user's field of view through a mixed reality headset. The mixed reality headset can be, for example, a Microsoft HoloLens. In one embodiment, the virtual image can be projected into the user's field of view through smart glasses. The smart glasses can be, for example, Google glass or Intel Vaunt. In one embodiment, the virtual image can be reflected from a display through a partially reflective lens disposed within the field of view of the user. The partially reflective lens can be, for example, a lens of the 2017 Mira Prism by Mira Labs, Inc. In one embodiment, the method can further include displaying the augmented video data on a display to the user substantially contemporaneously with capturing of the video data by the camera. In one embodiment, the display can be of a virtual reality headset. In one embodiment, the display and the camera can be of a mobile phone. In one embodiment, the synchronized session data can further include spatial data relating to locations of at least one of the plurality of objects within the field of view of the camera, and the set of data can include the spatial data. In one embodiment, the spatial data can be generated by one or more spatial sensors. In one embodiment, the spatial sensors can be selected from the group consisting of: 3D depth sensors, camera sensors, time-of-flight infrared sensors, structured infrared light sensors, stereoscopic cameras, and ultrasonic sensors.

In one embodiment, the camera and the inertial measurement unit can be incorporated into a device worn by the user, and the method can further include: processing the set of data including the video data and the motion data to determine a time-based series of spatial dispositions of the device, and processing the time-based series of spatial dispositions of the device to identify relative times during the session at which one or more of the plurality of steps commences. In one embodiment, the spatial dispositions can include relative locations of the device within an environment. In one embodiment, the spatial dispositions can include geolocations of the device. In one embodiment, the spatial dispositions can include orientations of the device. In one embodiment, the spatial dispositions can include poses of the device.

In one embodiment, processing the audio data to identify relative times during the session at which each of the plurality of steps commences can include: causing a textual transcription of the spoken words to be generated based on the audio data; and processing the textual transcription to identify trigger words indicative of commencement of a step.

In one embodiment, identify the object can be performed by at least: causing a textual transcription of the spoken words to be generated based on the audio data; processing the textual transcription to identify names of objects; referencing physical description data for the identified names of objects using a database that relates object names to physical description data for named objects; and processing video frames to identify objects within the video frames based on the physical description data for objects named in the textual transcription within temporal proximity to the video frames.

In one embodiment, the time-synchronized session data can further include sensor data captured by a sensor associated with the each of the plurality of objects, and the overlaid video content for the each object can be based on the sensor data.

A method can include: capturing, by a hands-free head-mounted device worn by a user, time-synchronized session data including: video data captured by a camera, audio data captured by a microphone within audio proximity of the camera; spatial data capture by one or more spatial sensors, and motion data captured by an inertial measurement unit physically fixed relative to the camera, wherein the time-synchronized session data relate to a session during which the user physically performs a procedure having a plurality of steps, and wherein the audio data include spoken words of the user; substantially contemporaneously with the capturing of the time-synchronized session data, processing the time-synchronized session data by a processor to identify relative times during the session at which one or more of the plurality of steps commences; and for each of the one or more of the plurality of steps, displaying on a display visible to the user of the hands-free head-mounted device, an indication of the each step while the each step is being performed.

A method for generating a procedural workflow can include: receiving, at a first time, an indication of a first event and a first timestamp; receiving, following reception of the indication of the first event, first video data received from a user device; associating the first video data with the first event; receiving, at a second time that is after the first time, an indication of a second event and a second timestamp; receiving, following reception of the indication of the second event, second video data received from the user device; associating the second video data with the second event; converting audio from the first video data into first text data and audio from the second video data into second text data; associating a first image or first video clip from the first video data with the first text data; and generating procedural workflow data including the first text data, the first image or first video clip, and the second text data.

In one embodiment, the reception of the indication of the first event can include receiving a first audio cue from a user of the user device. In one embodiment, the reception of the indication of the first event can include receiving a first gesture or first haptic feedback from a user of the user device. In one embodiment, the method can further include receiving a first indication to capture data from the user, wherein associating the first image or the first video clip from the first video data with the first text data includes capturing an image or video clip from the first video data at a time that corresponds to the time of the first indication to capture data. In one embodiment, generating the procedural workflow data can include generating a manual organized by event, wherein the first event includes the first text data and the first image or first video clip, and the second event includes the second text data. In one embodiment, receiving the first video data can further include receiving first spatial data. In one embodiment, the procedural workflow data can further include the at least some of the first spatial data.

In one embodiment, the method can further include: receiving, at a third time that is after the second time, an indication to repeat the second event and a third timestamp; receiving, following reception of the indication to repeat the second event, third video data received from the user device; and associating the third video data with the second event. In one embodiment, the method can further include deleting the second video data. In one embodiment, the method can further include converting the procedural workflow data into at least one of a plurality of knowledge transfer formats.

A method for generating a procedural workflow can include: generating an indication of a first event occurring at a first time; subsequent to the first time, capturing first video data and first geographic information by a user device; determining that a feature within the first video data, an elapsed time from the first time, or a position of the user device relative to the first geographic information changes by more than a threshold amount; in response to the determining, generating an indication of a second event occurring at a second time; associating first video data between the first time and the second time with the first event; subsequent to the second time, capturing second video data and optionally second geographic information by the user device; associating the second video data with the second event; converting audio from the first video data into first text data and audio from the second video data into second text data; and generating procedural workflow data including the first text data and the second text data.

In one embodiment, reception of the indication of the first event can include receiving a first audio cue from a user of the user device. In one embodiment, reception of the indication of the first event can include receiving a first gesture or first haptic feedback from a user of the user device. In one embodiment, determining that the feature within the video data changes by more than the threshold amount can include determining that an object detected with the video data is not present in the video data. In one embodiment, determining that the elapsed time from the first time is greater than the threshold amount of time can include counting a threshold amount of time from the first time. In one embodiment, the method can further include determining that an indication of a second event is not received before the threshold amount of time has elapsed. In one embodiment, determining that the position of the user changes by more than the threshold amount can include comparing a first geographic position of the user device at the first time with a second geographic position of the user after the first time. In one embodiment, generating the procedural workflow data can include generating a manual organized by event, wherein the first event includes the first text data and the second event includes the second text data. In one embodiment, receiving the video data can further include receiving spatial data. In one embodiment, the procedural workflow data can further include the at least some of the spatial data.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

Systems and associated methods leverage an augmented reality ("AR") device to capture the knowledge, skills, and experience of an expert frontline worker. In accordance with disclosed embodiments, frontline experts can leverage AR devices to document, modify, and share their knowledge, experience, and expertise with others without leaving their respective work environments.

Figure 1:
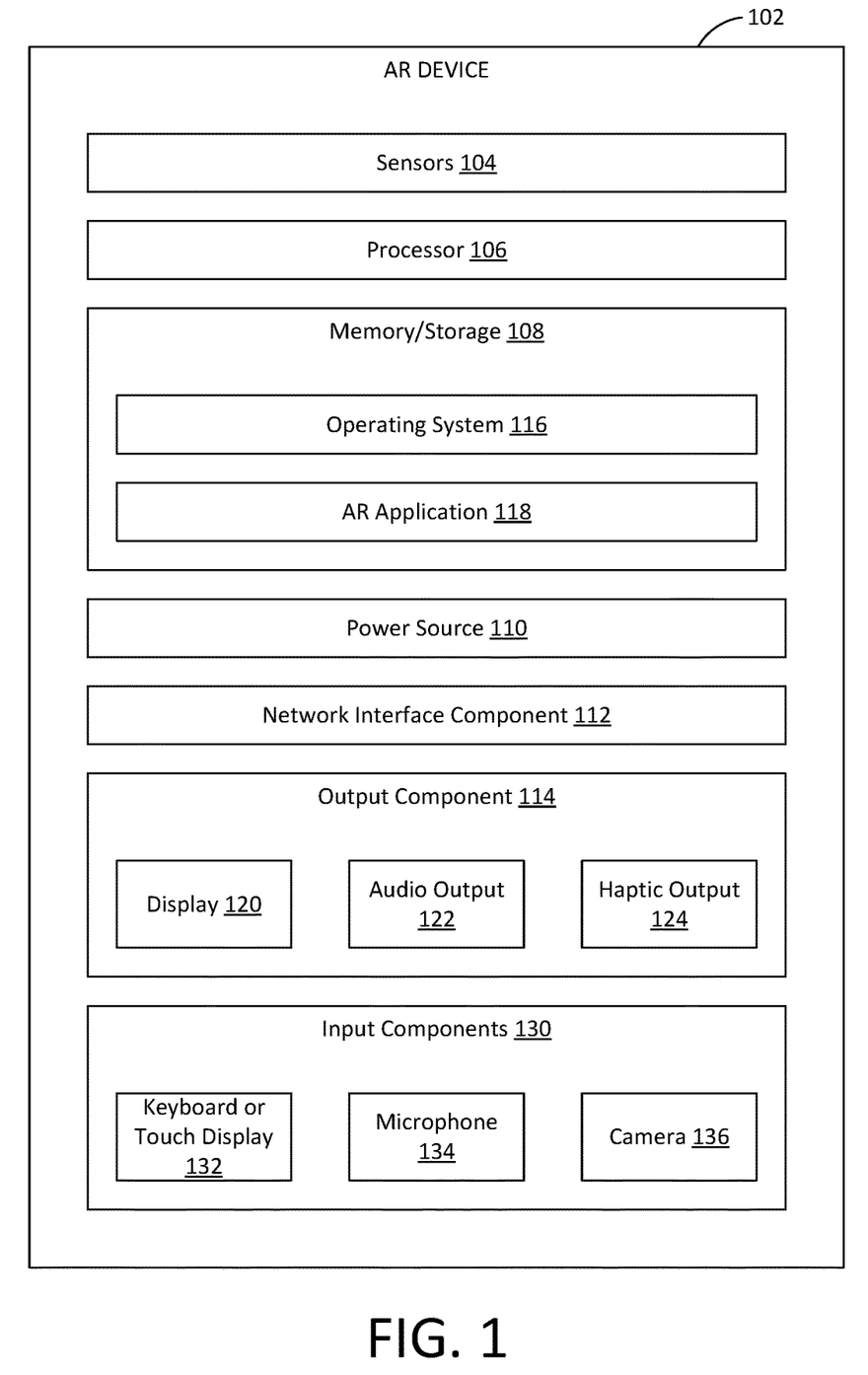
FIG. 1 illustrates a block diagram of an AR device including various components or modules in accordance with one embodiment.

FIG. 1 illustrates a block diagram of an AR device including various components or modules in accordance with one embodiment. In one embodiment, an AR device 102 can combine data from various sensors to present (via display, audio, haptics, projection, or any other output format or signal) an augmented perception of the world. AR devices can take on a variety of form factors to support user input and output including, for example, head-mounted devices, handheld devices, wearables, projection devices, and smart display screens.

An AR device can be mountable fully or partially on or around a user's head. Some components of the AR device can be configured to be fully or partially hand held. The AR device can be configured to be fully or partially worn on a user's body such as, for example, on the wrist or around the neck. The AR device can include one or more sensors 104 to collect data about the user's environment such as, for example, camera sensors to collect visual data, audio sensors to collect audio data, spatial sensors to collect depth data, light sensors to detect UV and IR data, haptic sensors to detect touch data, hand and finger tracking sensors to capture gesture data, an inertial measurement unit (IMU) sensor to capture movement data, and temperature sensors to capture temperature data, or any other data relating to the physical environment. The device can include one or more processors 106, a memory or storage component 108, a power source 110 (e.g., battery or power cord), and a network interface component 112.

The AR device can include one or more output components 114 to present information to the user. The output components can include one or more visual output components such as display screens or projection displays, one or more audio output components such as speakers, and/or one or more haptic output components such as a vibrator motor or force feedback component. In one embodiment, the AR device 102 includes a display 120, an audio output 122, such as a speaker or headphones, and a haptic output 124, such as a vibrator. The display 120, can be, for example, a same display as configured to provide AR features, such as AR glasses, or it can be a separate display.

In one embodiment, the AR device can include one or more software applications that facilitate the capture and transfer of knowledge. For example, the AR device may include an operating system 116. In one embodiment, the AR device includes an AR application 118 that performs knowledge capture and/or transfer using the AR device. The AR application can include one or more stand-alone applications installed on the AR device, a subcomponent of the operating system of the AR device, or a combination thereof.

In one embodiment, the AR device is connected to one or more peripheral devices. The peripheral devices can include devices such as external controllers, cameras, and sensors. External controllers can include input devices such as hand-held controllers or wearable sensors.

In one embodiment, the AR device 102 can include one or more user input components 130. The user input components can include, for example, a physical keyboard or touch sensitive display upon which a touch keyboard can be implemented 132, a microphone 134, and a camera 136. Some of these input components, such as the microphone and the camera, can serve dual purposes, receiving user input as well as acting as environmental sensors.

The AR device can be or include a head mounted display that places images of both the physical environment surrounding the user and virtual objects superimposed over and relative to the physical environment within the field of view of the user. The AR device can be or include augmented reality glasses or eyewear such as Google Glass, which project virtual images into the user's field of view superimposed over and relative to the actual physical environment as viewed through the lenses of the glasses. The AR device can be or include any commercially available device capable of implementing augmented reality functionality. For example, the AR device can be a mobile phone with a camera configured to augment video captured by the phone's camera on the phone's display. A hands-free AR device, however, may provide an advantage in that the worker-user can be free to use both hands to perform their tasks unencumbered by the need to hold the device as they perform a procedure or process that is being captured.

In one embodiment, the AR device can be a head-mounted holographic computer, such as, for example, the Microsoft HoloLens, which provides a mixed reality experience to the wearer. The holographic computer can include a stereoscopic holographic display, one or more cameras, audio output for the wearer, directional microphone inputs and an inertial measurement unit.

Figure 2:
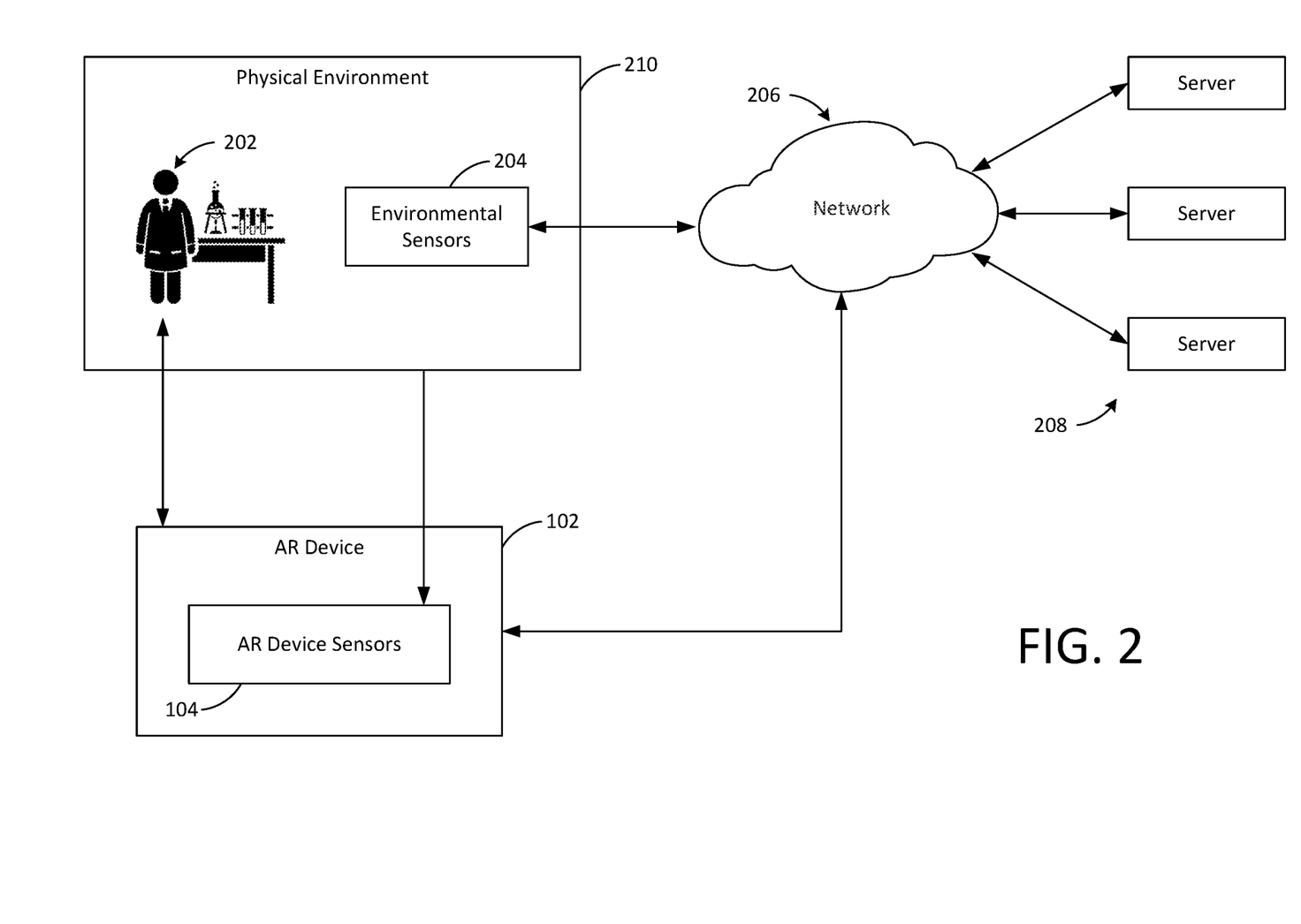
FIG. 2 illustrates a block diagram of an example network environment for capturing and transferring knowledge using at least one AR device in accordance with one embodiment.

FIG. 2 illustrates a block diagram of an example network environment for capturing and transferring knowledge using at least one AR device in accordance with one embodiment. In one embodiment, a user 202 interacts with an AR device 102 while using the AR device 102 in a physical environment 210. The AR device sensors 104 capture information regarding the user's physical environment 210 while the user uses the AR device 102. The physical environment 210 can include one or more environmental sensors 204 such as, for example, internet of things ("IoT") sensors that capture information, such as temperature, humidity, sound, light, or any other physical characteristic, about the user's physical environment 210, about other devices, objects, locations, or about other people, including the user, within the user's physical environment 210. In one embodiment, the AR device and the environmental sensors 204 can be configured to communicate with one or more servers 208 over a communication network 206. The communication network 206 can be the Internet.

Figure 3:
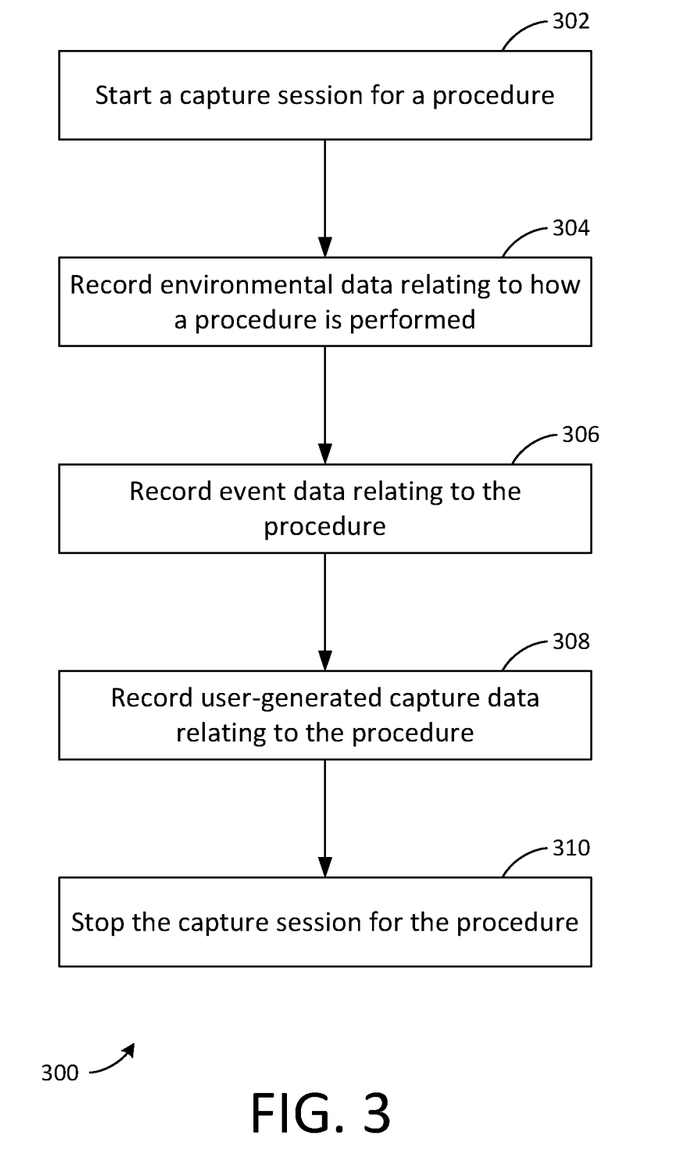
FIG. 3 illustrates a process for capturing knowledge using at least one AR device to produce knowledge capture data in accordance with one embodiment.

FIG. 3 illustrates a process 300 for capturing knowledge using at least one AR device to produce knowledge capture data. In one embodiment, this process is performed by or using at least one AR application executing on an AR device. The process 300 can be used to capture and record how a user performs a particular procedure in a physical environment. For example, the process can be used to capture how a lab technician performs a series of steps in an assay within a particular lab environment, or how a manufacturing line operator performs a series of steps in an assembly process at specific locations within a manufacturing facility.

Although the steps 304, 306 and 308 of the process 300 are shown in a particular order, these steps can be performed in any order, in serial, in parallel, and/or simultaneously. Although the process 300 is described with respect to an AR device, a device without augmented reality functionality can be used to perform the process 300 in one embodiment.

At a step 302, the capture session is initiated. In one embodiment, the AR application initiates the capture session. The AR application can initiate the session once the user inputs a specific command or set of commands into the AR device through one or more input sensors. For example, a user may initiate the session through a voice command (e.g., "start capture") or through a particular hand gesture (e.g. a thumbs up) or through some other form of user input (e.g., depressing a physical or virtual button). The AR device may also automatically initiate the capture session based on an initiation event triggered by the environment or from an external system. For example, the AR device may receive an initiation signal over a network connection (e.g., if the device includes a network interface component) or may detect a change in the environment through its input sensors (e.g., detect that the lights in a particular environment have turned on).

At a step 304, environmental data is recorded from at least one sensor of the AR device as the user performs the steps in the procedure during the capture session. In one embodiment, the AR application can manage the recording of the environmental data. For example, the AR device can begin recording how a lab technician performs the step-by-step procedure associated with a particular assay or set of assays.

In another example, the AR device can begin recording how an assembly line worker performs the step-by-step process of assembling a specific component or set of components. The recorded environmental data can be either raw or processed data generated from any one of or a combination of various sensors incorporated into or accessible by the AR device. These sensors can include, for example, one or more of cameras, microphones, depth sensors, infrared sensors, accelerometers, gyroscopes, thermometers, capacitive sensors, moisture sensors, and more generally any sensor for detecting information about the physical environment of the user. The sensors can produce sensor data, which sensor data can include, for example, one or more of visual data, audio data, gesture data, UV and IR data, touch and force data, movement data, temperature data, humidity data, etc. Motion of the AR device itself can be captured by an inertial measurement unit.

In one embodiment, the environmental data can be recorded as a sequential stream of data and/or sensor data. For example, the recorded environmental data can include video stream data, audio stream data, movement stream data, any other form of environmental stream data. Different data types can be combined streamed together or they can be streamed separately.

In one embodiment environmental data can include data generated by environmental sensors 204 located within the user's physical environment. Environmental sensors can include sensors that detect information about the environment or about any device or object within the environment. For example, environmental data can include IoT sensor data associated with connected devices located in the user's physical environment. In one embodiment environmental sensor data is received by the AR device. The environmental sensor data can be transmitted via a communications network directly to the AR device or it can be received from a remote server in communication with the AR device via a communications network. The environmental sensor data can be transmitted automatically or it can be transmitted only upon a request generated by the AR device.

According to one embodiment the environmental data can include spatial data about the physical environment. Spatial data can be raw or processed data generated using at least one of the sensors of the AR device such as, for example, 3D depth sensors, camera sensors, time-of-flight infrared, structured infrared light, or stereoscopic cameras, and/or ultrasonic sensors, any of which can be configured to act as a spatial sensor. In one embodiment the spatial data can be generated using computer vision and/or simultaneous localization and mapping (SLAM) algorithms to determine the orientation of the AR device in relation to its environment. Spatial data can include data describing the physical environment surrounding the AR device, the location, orientation, and movement of the AR device in relation to its physical environment, or both. Spatial data can also include information relating to the physical location, orientation, and movement of other items in the physical environment. Such items can include, for example, a user's body (e.g., leg, arm, hand, or finger positions), a tool, device, or equipment being operated by the user of the AR device (e.g., a physical control panel or hand-held tool such as a torque wrench), or some other object or feature of the environment (e.g., a piece of equipment such as a forklift, a hazardous area, a co-worker or teammate, a location where a step, sub-procedure or sub-process needs to be performed).

In one embodiment, spatial data can include a digital representation of the physical environment in which the AR device is being used. This digital representation can be 3D point-cloud data, 3D surface mesh data, or some other digital representation that can be used to recreate the physical structure of the environment digitally. The digital representation can be created using raw sensor data or through post-processing performed on-device or remotely (e.g., photogrammetry). The digital representation can include additional contextual information that provides more fidelity regarding the environment. For example, the digital representation can include additional data such as color data, texture data, and lighting data.

In one embodiment, the spatial data can be recorded as a sequential stream of data over a period of time. The spatial data stream can include information regarding at least the location and orientation of the AR device in relation to its environment at different instances of time. Accordingly, the spatial data stream can provide a recording of how the AR device moved through its environment during the capture period. The spatial data stream can also include information about the behavior of the user of the AR device over a period of time and/or about changes in the physical environment around the device over a period of time. For example, the spatial data stream can include information about the location and orientation of the user's limbs and/or appendages at discrete instances of time. The spatial data stream can also include spatial information about any tools or equipment the user operates during a period of time. The spatial data stream can also include spatial information about changes to other aspects of the user's environment such as equipment, other people, or important locations over a period of time.

At a step 306, event data relating to the procedure that is being captured during the capture session is recorded. In one embodiment, the event data can be recorded by the AR application. The event data can include information relating to at least one event that occurs during the capture session. In one embodiment, the event data can include one or more user-generated events, one or more device-generated events, or one or more externally-generated events. User-generated events can include events generated in response to user input commands, for example, when a user inputs a command to take a picture of the user's environment or to record a video snippet about how to perform a particular task. Other types of user-generated events can include user input indicating that the user is moving from one step to another step in the procedure that is being captured. Device-generated events can include events that are generated by the AR application, the AR device, or some combination thereof. For example, a device-generated event can be created by the AR application based on at least some of the captured sensor data. In another example, the AR application can generate a "new location" event after determining that the user has transitioned to a new physical location based on at least the spatial data. Externally-generated events can include events that are triggered by devices or systems external to the AR device but that have the ability to communicate with the AR device (either through a physical or wireless connection). For example, an event can be generated by a device or tool that is connected to the AR device and that is being operated by the user of the AR device.

In one embodiment, the information for each event in the event data can include event classification data and event timestamp data. The event classification data can include information about how the event was triggered (e.g., "user-generated," "system-generated," "device-generated," or "externally-generated") or about the type of event that occurred (e.g., "new step event," "redo step event," "new location event," "take picture event," etc.). The event timestamp data can be generated using the AR device clock, can be a timestamp offset from the beginning of the capture session, or can be any other form of timestamp. In one embodiment, the event data can be a sequential stream of event data for one or more events that occur during the capture session.

In one embodiment, event data can include step marker data containing information relating to discrete steps in the procedure being captured in the capture session. Step marker data can include at least one step marker identifying when a user starts a new step in the procedure or when the user ends a step in the procedure. The step marker can include a classification of whether the event is a step start or step end event. The step marker data can also include the timestamp of the event. The step marker data can be created, for example, by a user input to the AR device indicating the start or end of a step in a procedure or process being performed by the user. The user input can be received, for example, through a voice command by the user, or by user selection of a virtual or actual user-interface option, such as an actual or displayed button.

In one embodiment, the environmental data recorded in step 304 can be segmented into steps. The recorded environmental data can be saved to storage in segments associated with step marker data. The environmental data segments can be created based on the generation of a step start marker event and a step end marker event. In one embodiment one or more new environmental data segments can be created every time a step marker event associated with a new step is generated. Any new environmental data generated after the occurrence of the new step event can be stored in the new environmental data segment or segments until the occurrence of another new step event. In one embodiment, the recording of the environmental data can stop based on the generation of a step end event marker. The generation of the environmental data segments can be managed by the AR application or by a remote device or server. In one embodiment, the environmental data segments can be stored locally on the AR device and transmitted to a remote server after a capture session. The environmental data segments can also be transmitted to a remote server during the capture session.

At a step 308, user-generated capture data relating to the procedure that is being captured is recorded. In one embodiment, the user-generated capture data can be recorded by the AR application. User-generated capture data can be any type of data that are recorded based on a user's input. In one embodiment user-generated capture data can include picture snapshots, spatial snapshots, video clips, audio clips, spatial clips, or any other type of data that can be generated by the AR device based on user input. For example, a user can take a snapshot of an important location, item, or feature related to at least one step in the procedure or process. That snapshot can be in the form of a picture or of a 3D capture of the important location or item of interest. The user can record a clip of an important part of at least one step in the procedure. The clip can be recorded in the form of a video recording, an audio recording, or a spatial recording of the environment during a short period of time. In one embodiment, the user-generated capture data can be automatically associated with the step that the user is capturing when the user-generated capture data is created. For example, if the user is recording step two of a particular procedure and takes a picture snapshot during that step, the picture snapshot can be associated with step two.

The user-generated capture data can be created in response to any type of user input such as, for example, voice input, gesture input, haptic input, or any other form of input that is based on user behavior. The user input may not even require direct user input but can also be based on passive user behavior, such as if the user looks at a particular location or item for more than a threshold amount of time or if the user looks at a particular location or item more than a threshold number of times. Other forms of passive user behavior that can be used to generate capture data can include user location information (e.g., if the user spends more than a threshold amount of time at a particular location or comes within a predetermined vicinity of a particular location more than a threshold number of times), user biometric information (e.g., if user biometric data deviates beyond a predetermined threshold or does so for more than predetermined number of times), user movement information (e.g., if the user stops moving for more than a predetermined amount of time or if the user moves more than a predetermined amount of times), or any other form of passive user behavior information.

In step 310 the capture session for the procedure is concluded. In one embodiment, the capture session is ended by the AR application. The capture session can be ended based on user input signaling the end of the capture session. This user input can be provided in any format, such as voice input, gesture input, haptic input, or any other input based on user behavior. For example, the user can provide voice input to stop the capture session by saying the phrase "End Capture" or can perform a hand gesture that signals the end of the capture session.

In one embodiment, the capture session can end automatically without direct user input based on passive user behavior, device state, environmental triggers, or external events. For example, the AR application can automatically stop capturing the procedure when it determines that the user has moved to a predetermined location indicating that the procedure is no longer being performed. The AR application can also automatically stop capturing the procedure if the user points at least one camera towards a predetermined visual or spatial marker indicating an end of the capture session. The AR application can also stop capturing the session if it determines that it has been idle for a predetermined amount of time.

Once the capture session is ended, the AR application can store all of the environmental data, event data, and user-generated capture data for that capture session to local storage. This data for the captured session can be stored as knowledge capture data in a predetermined format. The knowledge capture data can include serialized data. The knowledge capture data can include metadata that associates each step in the procedure or process with the environmental data, event data, or user-generated data that was created during that step. In one embodiment, each capture session is associated with one set of knowledge capture data.

In one embodiment, the knowledge capture data for one or more capture sessions can be transmitted to another device at the end of the capture session. The other device can be a server or a storage device. The other device can be located within the same premises as the AR device or can be located remotely in a different location.

Figure 4:
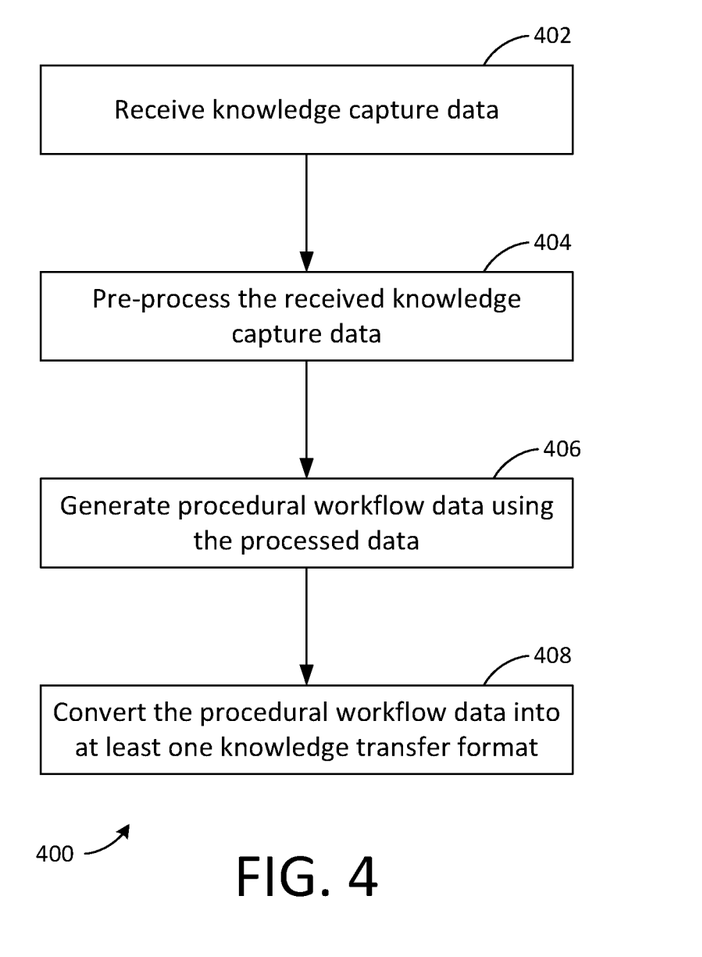
FIG. 4 illustrates a process for processing knowledge capture data created using an AR device in accordance with one embodiment.

FIG. 4 illustrates a process 400 for processing knowledge capture data created using an AR device in accordance with one embodiment. In one embodiment, the process of FIG. 4 can be performed by a knowledge processing engine, which can be an application or service operating on a computing device. The knowledge processing engine can convert knowledge capture data created using an AR capture device into procedural workflow data and output the procedural workflow data in one of several knowledge transfer formats. The knowledge processing engine can execute on the AR device that created the knowledge capture data, on a server that has received the knowledge capture data directly or indirectly from the AR device, or on both in part.

At a step 402, the knowledge capture data is received for one or more capture sessions. In one embodiment, the knowledge capture data can be received by the knowledge processing engine. The knowledge processing engine can receive the knowledge capture data from one or more AR devices or from a server or database that can act as storage location for the knowledge capture data. The knowledge capture data can be segregated into session data associated with separate capture sessions. In one embodiment, the knowledge processing engine receives only metadata associated with the knowledge capture data, where the metadata is or includes one or more links referencing locations of the knowledge capture data or the remainder thereof.

At a step 404, the received knowledge capture data is pre-processed. The knowledge capture data can be pre-processed by the knowledge processing engine. In one embodiment, the knowledge processing engine can pre-process the knowledge capture data to identify and extract important information regarding a procedure captured within a set of knowledge capture data.

In one embodiment, the knowledge processing engine can identify audio data included in the knowledge capture data and generate textual transcription of the words spoken in at least some of the audio data. In one embodiment, the textual transcription can be performed automatically from the audio data. The automatic text transcription can be performed using textual transcription algorithms, which can be included in or used by the knowledge processing engine. The automatic text transcription can also be performed by transmitting the audio data to a remote transcription server that performs the automatic transcription and returns textual transcription data back to the knowledge processing engine.

In one embodiment, at least some of the textual transcription can be performed manually by a user. In one embodiment, the knowledge processing engine can provide a user interface that provides controls to access and review audio data within the knowledge capture data, and to manually enter textual transcriptions associated with that audio data. The user interface can be configured to be accessible by one or more remote devices that connect to a server hosting the knowledge processing engine, such as, for example, through http or other remote connection protocols. In one embodiment, the knowledge processing engine can automatically generate textual transcriptions first (either through local algorithms or through a transcription server) and the user interface can present the automatically generated transcriptions to the a user for manual review and editing.

The knowledge processing engine can be configured to analyze video or spatial data in the knowledge capture data to identify important video or spatial clips. In one embodiment, the important video or spatial clips can be identified automatically. The automatic identification can be performed using machine learning algorithms, such as computer vision algorithms, included in or used by the knowledge processing engine. The automatic identification can be performed by transmitting the video or spatial data to a remote server that performs the automatic identification and returns extracted video or spatial clips to the knowledge processing engine.

In one embodiment, at least some of the identification of important video or audio clips can be performed manually by a user. In one embodiment, the knowledge processing engine can provide a user interface that provides controls to access and review video or spatial data within the knowledge capture data, and to manually identify and extract important video or spatial clips and associate them with relevant step data. The user interface can configured to be accessible by one or more remote devices that connect to a server hosting the knowledge processing engine, such as for example through http or other remote connection protocols. In one embodiment, the knowledge processing engine can automatically generate suggestions for important video or spatial clips first (either through local algorithms or through a transcription server), and the user interface can present the automatically generated recommendations to a user for manual review and editing.

In one embodiment, the knowledge processing engine can provide a user interface that provides controls to review and modify logical relationships between steps in the captured data. The user interface can provide controls to reorder the sequence of the steps such as by dragging and dropping steps to different locations within the logical sequence. The user interface can provide controls to modify the dependencies between steps. In one embodiment, the user interface can provide controls to require that certain steps be performed before other steps are enabled or become active. The user interface can also provide controls to create or modify conditional relationships between steps.

Once an end user has reviewed and made any changes to the photos, video clips, spatial clips, additional multimedia, and logical relationships between steps using the user interface, the user can mark the final set of data as approved. The knowledge processing engine can automatically determine completion of the pre-processing step or can receive input from a user that pre-processing is complete.

At a step 406, procedural workflow data is generated using the pre-processed knowledge capture data. This generation step can be performed by the knowledge processing engine. In one embodiment, the knowledge processing engine converts the pre-processed knowledge capture data into a predetermined procedural workflow data format. The procedural workflow data format can be a structured file format that links environmental, event, and user-generated capture data to at least one step in a procedure. The procedural workflow data format can also link multiple steps in a procedure together in a manner that reflects the process flow of the procedure. In one embodiment the steps can be linked together in a sequential manner. The procedural workflow format can also include decision steps that are linked to two or more steps representing different paths in a procedural workflow based on the outcome of the decision.

Once the procedural workflow data is generated, it can be stored in a procedural workflow database. The procedural workflow database can reside on the same server as the knowledge processing engine or can reside in a remote server. The procedural workflow database can be any form of database including a relational database.

At a step 408 the procedural workflow data is converted into at least one knowledge transfer format. This conversion step can be performed by the knowledge processing engine. In one embodiment, the knowledge transfer format is a structured file format that contains at least some of the information stored in the procedural workflow data and packages that information into a file format that can be used to output the information in a specific manner.

One type of knowledge transfer format can be a document file format that packages photo and text data for each step in a procedure or process into a document file that can be viewed using commercially available document viewing software. For example, the document file format can be .DOCX, .PDF, or any other file format for storing and presenting a document.

Another knowledge transfer format can include a markup language file format that links photo, video, and text data for each step in a procedure or process into a markup file that can be viewed by software designed to view markup files. For example, the markup language file format can be HTML, XML, or any other format for storing and presenting markup language files. This type of knowledge transfer format can be used to present at least a subset of the information contained in the procedural workflow data to at least one user through a browser application. The browser application can output information to the end user through a display of a mobile device such as, for example, a mobile phone, tablet, headset, or any other form of wearable device. The display of the mobile device can include one or more display screens or projection displays and one or more audio output components such as speakers.

The knowledge transfer format can include a holographic training file format that links photo, video, text, and spatial data for each step in a procedure or process into a holographic training file that can be viewed and edited by software designed to view and edit holographic training files. The holographic training file can be used, for example, by a holographic head-mounted headset computer, such as the Microsoft HoloLens, to demonstrate to a wearer how to perform a procedure in a mixed-reality environment. In one embodiment, the format can also include other data in the holographic training file such as UV and IR data, touch data, gesture data, movement data, temperature data, humidity data, or any other kind of data captured during a capture session. This type of knowledge transfer format can be used to present at least a subset of the information contained in the procedural workflow data to at least one user through a holographic application. The holographic application can output information to the end user through a display of an AR device such as, for example, an AR-enabled mobile phone or tablet, an AR headset, a virtual reality headset, a projection device, or any other form of wearable device with mixed reality capabilities.

In one embodiment, the holographic training file format can be output to a device that has virtual reality ("VR") capabilities. VR capabilities include the ability to present information to a user in an immersive format such that the user cannot see the user's surrounding environment. A device with VR capabilities can include a VR headset. It can also include an AR headset with the ability to convert to an immersive VR form factor.

In one embodiment, the step 408 is performed by a knowledge transfer engine. The knowledge transfer engine can execute on the same server as the knowledge processing engine or can execute on a separate server. The knowledge transfer engine can have access to the procedural knowledge data such as, for example, through the procedural knowledge database.

Figure 5:
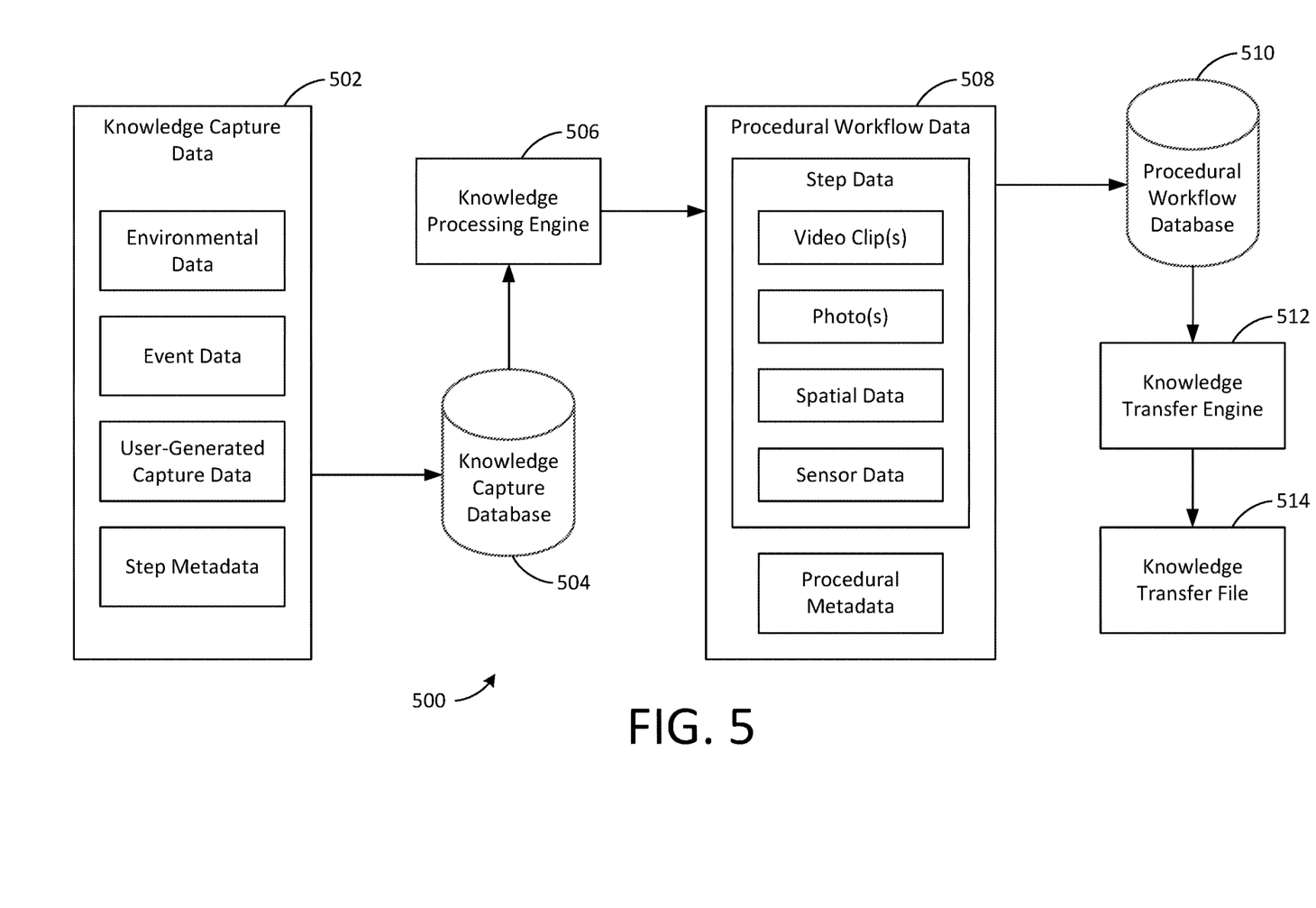
FIG. 5 illustrates a block diagram of a conversion of knowledge capture data into knowledge transfer data in accordance with one embodiment.

FIG. 5 illustrates a block diagram 500 of a conversion of knowledge capture data into knowledge transfer data in accordance with one embodiment. Knowledge capture data 504, which can include environmental data, event data, user-generated capture data, and step metadata is transmitted via a communications network 206 to a knowledge capture database 504. The knowledge processing engine 506 receives the knowledge capture data 504 from the knowledge capture database 504, processes it, and converts it to procedural workflow data 508. Procedural workflow data 508 can include step data for each of one or more steps in a procedure. For each step in the procedure, the step data can include one or more of video clips, photos, spatial data and sensor data. The procedural workflow data 508 can include procedural metadata. The procedural metadata can include logical associations that connect two or more steps together into a procedural workflow. The logical associations can include linear associations and conditional associations between steps in a procedure. Linear associations can indicate direct relationships linking one step to another, e.g., one step is performed before the other. Conditional associations can indicate a conditional relationship between steps, e.g., one step is only performed after another if a specific condition or set of conditions is reached. Once procedural workflow data 508 is generated by the knowledge processing engine 506 it can be transferred to a procedural workflow database 510. A knowledge transfer engine 512 can convert the procedural workflow data 508 into a knowledge transfer file 514.

EXEMPLARY EMBODIMENTS

In one embodiment, an AR application operates to control a head-mounted AR device. The AR device can include, for example, at least one camera, a microphone, and a spatial depth sensor. The AR device can be configured to accept user input through various user input interfaces, where the user input can be, for example, voice input, gesture input, haptic input, input from the manipulation of the AR device itself (e.g., by moving the device or actuation of a button or joystick), or input from the manipulation of a peripheral device. In one embodiment, a user can wear the head-mounted AR device and launch the AR application. The user can input a command through one or more input interfaces to indicate that the user is initiating a capture session for a target procedure or process that is desired to be captured. Upon receiving the command, the AR application can begin recording sensor stream data regarding the user's behavior and environment. The sensor stream data can include video stream, audio stream, and spatial stream data. The user can then perform a first step in a procedure that the user seeks to capture. When the user is finished with the first step, the user can input a command through one or more of the input interfaces to indicate that the user is progressing to a next step in the procedure. The user can then continue to progress through all the steps of the target process in this manner.

If, as the user progresses through the steps of the procedure, the user wants to take photographs of certain aspects of the procedure, then the user can input a command through one or more input interfaces to take a picture. The AR application can present a viewfinder user interface depicting a video feed from one or more of the AR device's cameras on a display component of the AR device. The AR application can also present a visual countdown timer on the display component in order to provide advance notice to the user of when the photo will be taken. The AR application can present the captured photo on the display component for a predetermined period of time in order to allow the user to review the photo before removing the viewfinder and photo from the display. The AR application can store the photo and associate it with the current step of the target procedure being performed.

If the user wants to create a video clip of part of the procedure, then the user can input a command through one or more input interfaces to start recording a video clip and can enter another command to stop recording the video clip. When the user inputs the command to start recording a video clip, the AR application can present a viewfinder user interface depicting a video feed from one or more of the AR device's cameras on the display component of the AR device. The AR application can also present a visual indicator (such as a flashing red icon) on the display component in order to indicate to the user that a video is being recorded. The AR application can remove the viewfinder user interface from the display once the user inputs the command to stop recording the video clip. The AR application can store the video clip and associate it with the current step of the target procedure being performed.

If the user wants to create a spatial clip of part of the procedure, then the user can input a command through one or more input interfaces to start recording a spatial clip and can enter another command to stop recording the spatial clip. When the user inputs the command to start recording a spatial clip, the AR application can present a user interface depicting a wireframe object overlaid or superimposed on the environment on the display component of the AR device. The AR application can also present a visual indicator (such as a flashing red icon) on the display component in order to indicate to the user that spatial data is being recorded. The AR application can remove the wireframe overlay from the display once the user inputs the command to stop recording the spatial clip. The AR application can store the spatial clip and associate it with the current step of the target procedure being performed.

Once the user has completed all the steps in the target procedure, the user can input a command from one or more of the input interfaces indicating that the procedure is complete and the capture session has ended. The AR application can then stop recording the sensor stream data (such as the video stream, audio stream, and spatial stream data). The AR application can also output a knowledge capture file that links any photos, video clips, and spatial clips created during the capture session to the steps during which they were created. The AR application can then transfer the sensor stream data, the knowledge capture file, and any photos, video clips, and spatial clips associated with the capture session to a knowledge capture database.

In one embodiment, a knowledge processing engine can receive knowledge capture data associated with a capture session. The knowledge processing engine can execute on a server. Upon receipt, the knowledge processing engine can begin pre-processing the knowledge capture data. The pre-processing can include performing a voice-to-text conversion of audio data for at least some steps in the knowledge capture data. The voice-to-text conversion can be performed automatically, can be performed through manual transcription by a human, or can be performed by a combination of both. The audio data can be transmitted to a voice-to-text module for automatic conversion into text. The voice-to-text module can reside on a remote server. The voice-to-text module can process the audio data and return text data. The returned text data can be presented to an end user for review and editing through a user interface. The user interface can be presented at a remote computer via a web browser connected to the knowledge processing engine. The user interface can include an interface to listen to and manually transcribe the audio data into text data. Once an end user has reviewed and made any changes to the text data via the user interface, the user can mark the text data as approved.

Pre-processing can also include final analysis and review of photos, video clips, and spatial clips associated with steps in the knowledge capture data. A user interface can be presented to enable an end user to review any photos, video clips, and spatial clips associated with each step in the process. The user interface can be presented at a remote computer, such as through a web browser connected to the knowledge processing engine. The user interface can include controls to view, edit, remove, and replace any photos, video clips, and spatial clips for each step.

The user interface can also include controls to modify the relationships between steps in the captured data. The user interface can enable a user to reorder the sequence of the steps such as by dragging and dropping steps to a different location within a logical sequence. The user interface can also enable users to modify the dependencies between steps. The user interface can also enable users to create conditional relationships between steps, such that some steps can only occur if certain conditions are met. Once an end user has reviewed and made any changes to the photos, video clips, and spatial clips using the user interface, the user can mark the final set of data as approved.

Once the photo, video, spatial, and text data for each step is created, reviewed, and approved during pre-processing, the knowledge processing engine can convert the pre-processed knowledge capture data into a procedural workflow data format. The procedural workflow data format can link the photo, video, spatial, and text data with metadata about each step in the captured procedure. The procedural workflow data format can link steps in a procedure together in a sequential manner. Some steps can be decision steps that are linked to two or more steps representing different paths in the procedural workflow. The formatted procedural workflow data can then be stored in a procedural workflow database.

In one embodiment, a knowledge transfer engine can receive procedural workflow data from the procedural workflow database. An end user can instruct the knowledge transfer engine to convert the procedural workflow data into a knowledge transfer file format. The knowledge transfer file format can be a document file format or a set of hyperlinked documents, which can be multimedia documents. The knowledge transfer engine can extract the photo and text data for each step in the procedural workflow data and generate a formatted document containing photos and text descriptions for each step in a procedure. The formatted document can be transmitted to an end user for review.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include standalone, client and/or server computers, which can be optionally networked through wired and/or wireless networks as a networked computer system.

Figure 6:
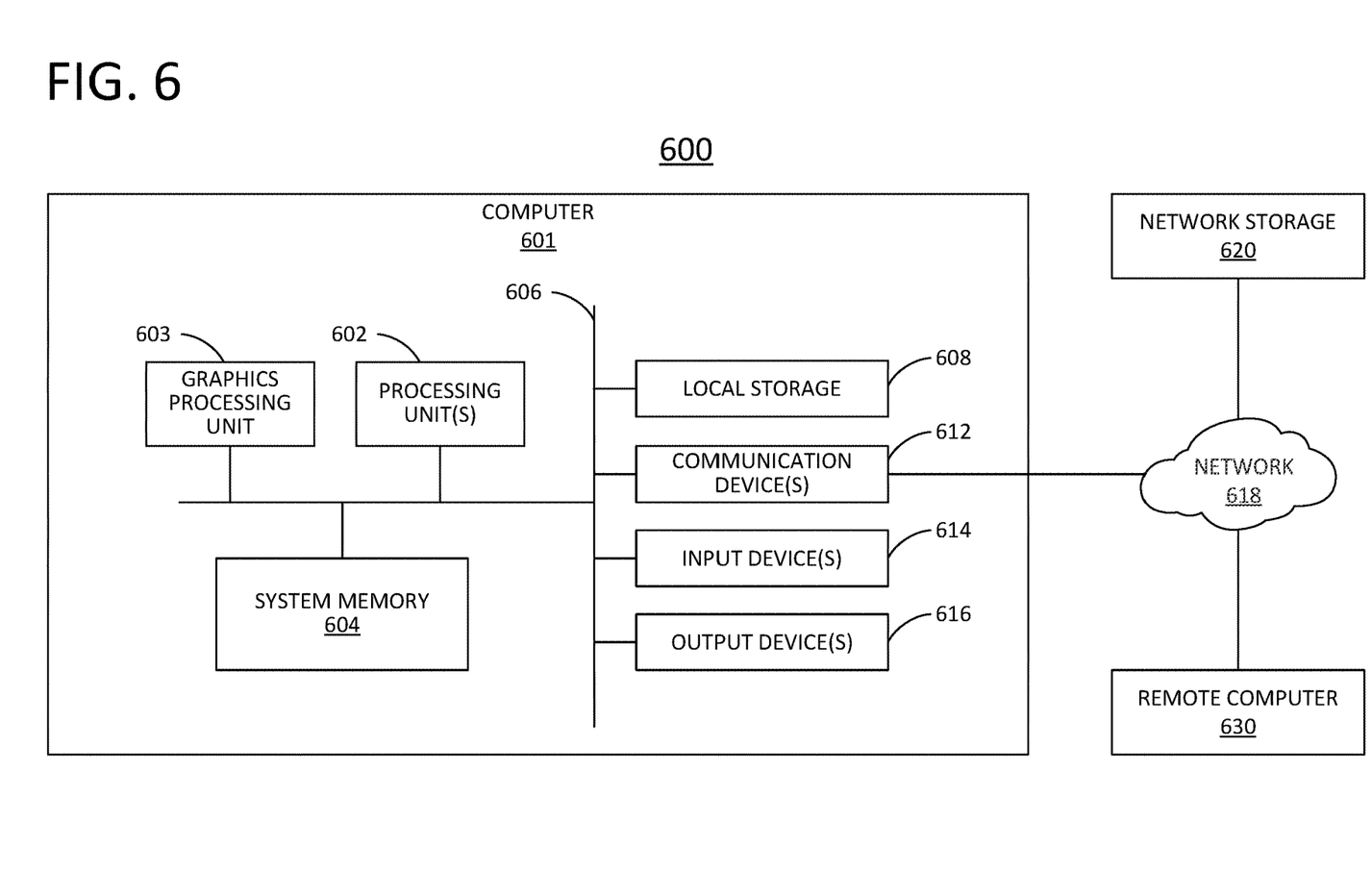
FIG. 6 illustrates a general computer architecture that can be appropriately configured to implement components disclosed in accordance with various embodiments.

FIG. 6 illustrates a general computer architecture 600 that can be appropriately configured to implement components disclosed in accordance with various embodiments. The computing architecture 600 can include various common computing elements, such as a computer 601, a network 618, and one or more remote computers 630. The embodiments disclosed herein, however, are not limited to implementation by the general computing architecture 600.

Referring to FIG. 6, the computer 601 can be any of a variety of general purpose computers such as, for example, a server, a desktop computer, a laptop computer, a tablet computer or a mobile computing device. The computer 601 can include a processing unit 602, a system memory 604 and a system bus 606.

The processing unit 602 can be any of various commercially available computer processors that can include one or more processing cores, which can operate independently of each other. Additional co-processing units, such as a graphics processing unit 603, also can be present in the computer.

The system memory 604 can include volatile devices, such as dynamic random access memory (DRAM) or other random access memory devices. The system memory 604 can also or alternatively include non-volatile devices, such as a read-only memory or flash memory.

The computer 601 can include local non-volatile secondary storage 608 such as a disk drive, solid state disk, or removable memory card. The local storage 608 can include one or more removable and/or non-removable storage units. The local storage 608 can be used to store an operating system that initiates and manages various applications that execute on the computer. The local storage 608 can also be used to store special purpose software configured to implement the components of the embodiments disclosed herein and that can be executed as one or more applications under the operating system.

The computer 601 can also include communication device(s) 612 through which the computer communicates with other devices, such as one or more remote computers 630, over wired and/or wireless computer networks 618. Communications device(s) 612 can include, for example, a network interface for communicating data over a wired computer network. The communication device(s) 612 can include, for example, one or more radio transmitters for communications over Wi-Fi, Bluetooth, and/or mobile telephone networks.

The computer 601 can also access network storage 620 through the computer network 618. The network storage can include, for example, a network attached storage device located on a local network, or cloud-based storage hosted at one or more remote data centers. The operating system and/or special purpose software can alternatively be stored in the network storage 620.

The computer 601 can have various input device(s) 614 such as a keyboard, mouse, touchscreen, camera, microphone, accelerometer, thermometer, magnetometer, or any other sensor. Output device(s) 616 such as a display, speakers, printer, or eccentric rotating mass vibration motor can also be included.

The various storage 608, communication device(s) 612, output devices 616 and input devices 614 can be integrated within a housing of the computer, or can be connected through various input/output interface devices on the computer, in which case the reference numbers 608, 612, 614 and 616 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

Although the subject matter has been described in terms of certain embodiments, other embodiments, including embodiments which may or may not provide various features and advantages set forth herein will be apparent to those of ordinary skill in the art in view of the foregoing disclosure. The specific embodiments described above are disclosed as examples only, and the scope of the patented subject matter is defined by the claims that follow.

In the claims, the term "based upon" shall include situations in which a factor is taken into account directly and/or indirectly, and possibly in conjunction with other factors, in producing a result or effect. In the claims, a portion shall include greater than none and up to the whole of a thing.

The invention claimed is:

1. A method performed by a computer system having at least one processor and a memory, the method comprising, the computer system:

receiving time-synchronized session data comprising video data captured by a camera, audio data captured by a microphone within audio proximity of the camera, and motion data captured by an inertial measurement unit physically fixed relative to the camera, wherein the time-synchronized session data relate to a continuously recorded session during which a user physically performs a procedure having a plurality of steps, and wherein the audio data comprise spoken words of the user;

causing a textual transcription of the spoken words to be generated based on the audio data;

processing the textual transcription to identify trigger words indicative of commencement of each step of the procedure;

processing the audio data to identify timestamps during the session at which one or more of the plurality of steps commences;

processing a set of data comprising the video data and the motion data to, for each of one or more objects within a field of view of the camera:

identify the object, track the object over time, using the motion data, to determine a time-based series of locations of the object within the field of view of and relative to the camera, and augment the video data by overlaying added visual content over video frames containing the object, such that the added visual content tracks motion of the object within the video frames over time;

store, in association with one another:

the video data, the audio data, the identified timestamps, and the augmentations to the video data;

generating procedural workflow data including step data for each of the plurality of steps based on the video data, the audio data, and the textual transcription; and outputting the procedural workflow data in a markup language format that links photo, video and text data for each of the plurality of steps for display in a browser application.

2. The method of claim 1, further comprising, substantially contemporaneously with capturing of the video data by the camera, for each of the one or more objects, displaying the added visual content as a virtual image in spatial relation to and tracking with the object in the user's visual field of view.

3. The method of claim 2, wherein the virtual image is projected into the user's field of view through a mixed reality headset.

4. The method of claim 3, wherein the virtual image is projected into the user's field of view through smart glasses.

5. The method of claim 3, wherein the virtual image is reflected from a display through a partially reflective lens disposed within the field of view of the user.

6. The method of claim 1, further comprising displaying the augmented video data on a display to the user substantially contemporaneously with capturing of the video data by the camera.

7. The method of claim 6, wherein the display is of a virtual reality headset.

8. The method of claim 6, wherein the display and the camera are of a mobile phone.

9. The method of claim 1, wherein the synchronized session data further comprises spatial data relating to locations of at least one of the plurality of objects within the field of view of the camera, and wherein the set of data comprises the spatial data.

10. The method of claim 9, wherein the spatial data is generated by one or more spatial sensors.

11. The method of claim 10, wherein the spatial sensors are selected from the group consisting of: 3D depth sensors, camera sensors, time-of-flight infrared sensors, structured infrared light sensors, stereoscopic cameras, and ultrasonic sensors.

12. The method of claim 1, wherein the camera and the inertial measurement unit are incorporated into a device worn by the user, the method further comprising:

processing the set of data comprising the video data and the motion data to determine a time-based series of spatial dispositions of the device, and processing the time-based series of spatial dispositions of the device to identify timestamps during the session at which one or more of the plurality of steps commences.

13. The method of claim 12, wherein the spatial dispositions comprise relative locations of the device within an environment.

14. The method of claim 12, wherein the spatial dispositions comprise geolocations of the device.

15. The method of claim 12, wherein the spatial dispositions comprise orientations of the device.

16. The method of claim 1, wherein identify the object is performed by at least:

causing a textual transcription of the spoken words to be generated based on the audio data;

processing the textual transcription to identify names of objects;

referencing physical description data for the identified names of objects using a database that relates object names to physical description data for named objects; and processing video frames to identify objects within the video frames based on the physical description data for objects named in the textual transcription within temporal proximity to the video frames.

17. The method of claim 1, wherein the time-synchronized session data further comprises sensor data captured by a sensor associated with the each of the plurality of objects, and wherein the overlaid video content for the each object is based on the sensor data.

* * * * *